US012735541B2

(12) United States Patent
Kawai et al.

(10) Patent No.: US 12,735,541 B2
(45) Date of Patent: Sep. 15, 2026

(54) BIAXIALLY ORIENTED POLYESTER FILM

(71) Applicant: TOYOBO CO., LTD., Osaka (JP)

(72) Inventors: Kiwamu Kawai, Tsuruga (JP); Akira Shimizu, Tsuruga (JP); Kenji Yoshino, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 168 days.

(21) Appl. No.: 18/694,320

(22) PCT Filed: Sep. 30, 2022

(86) PCT No.: PCT/JP2022/036771
§ 371 (c)(1),
(2) Date: Mar. 21, 2024

(87) PCT Pub. No.: WO2023/063117
PCT Pub. Date: Apr. 20, 2023

(65) Prior Publication Data

US 2025/0129220 A1 Apr. 24, 2025

(30) Foreign Application Priority Data

Oct. 12, 2021 (JP) ................................ 2021-167264

(51) Int. Cl.
*C08J 5/18* (2006.01)
*C08J 7/04* (2020.01)
*C08J 7/043* (2020.01)
*C08K 3/08* (2006.01)

(52) U.S. Cl.
CPC ............... *C08J 5/18* (2013.01); *C08J 7/0423* (2020.01); *C08J 7/043* (2020.01); *C08K 3/08* (2013.01); *C08J 2375/06* (2013.01); *C08J 2467/06* (2013.01); *C08K 2003/0806* (2013.01)

(58) Field of Classification Search
None
See application file for complete search history.

(56) References Cited

U.S. PATENT DOCUMENTS

2004/0161620 A1 8/2004 Tanaka et al.
2005/0064140 A1* 3/2005 Furuya ................. H05K 1/0326 428/209
2009/0082529 A1* 3/2009 Kageyama ............ C08G 63/84 526/66
2022/0126495 A1 4/2022 Haruta et al.

FOREIGN PATENT DOCUMENTS

CN 1311010 C 4/2007
JP 2002-249565 A 9/2002
JP 2005-193643 A 7/2005
JP 2006-159541 A 6/2006
JP 2010-189593 A 9/2010
JP 2017-177679 A 10/2017
JP 2018-184509 A 11/2018
JP 2019127536 A * 8/2019
TW 200420423 A 10/2004
TW 202041581 A 11/2020

OTHER PUBLICATIONS

Taiwan Intellectual Property Office, Office Action in Taiwanese Patent Application No. 111136658 (Nov. 1, 2024).
European Patent Office, Extended European Search Report in European Patent Application No. 22880813.5 (Jan. 13, 2025).
Taiwan Intellectual Property Office, Office Action in Taiwanese Patent Application No. 111136658 (Mar. 28, 2024).
Japan Patent Office, International Search Report in International Patent Application No. PCT/JP2022/036771 (Dec. 13, 2022).
Taiwan Patent Office, Office Action in Taiwanese Patent Application No. 111136658 (Jul. 19, 2023).
Korean Intellectual Property Office, Office Action in Korean Patent Application No. 10-2024-7012656 (Feb. 25, 2026).

* cited by examiner

*Primary Examiner* — Sheeba Ahmed

(74) *Attorney, Agent, or Firm* — Leydig, Voit & Mayer, Ltd.

(57) ABSTRACT

Provided is a biaxially oriented polyester film in which poor flatness that may be caused during heat processing is suppressed. In the biaxially oriented polyester film, the content rate of an ester constituting unit derived from an isophthalic acid component is 0.5-5.0 mol % with respect to 100 mol % of all ester constituting units, the amount of change in haze of the film is 5.0% or less, the intrinsic viscosity of constitutional polyester resins is 0.59-0.65 dl/g, the average value of storage moduli is $5.0\text{-}7.6\times10^8$ [Pa], the acid value of the film is 40-60 eq/ton, and the relational expression is satisfied: $X\times(Ymax^3-Ymin^3)\leq0.0591\times(X\times Ymin^3)+0.005$, where X is the storage modulus at 170° C., and Y is the film thickness per 1000 mm in the transverse direction with Ymax as the maximum value and Ymin as the minimum value.

5 Claims, 1 Drawing Sheet

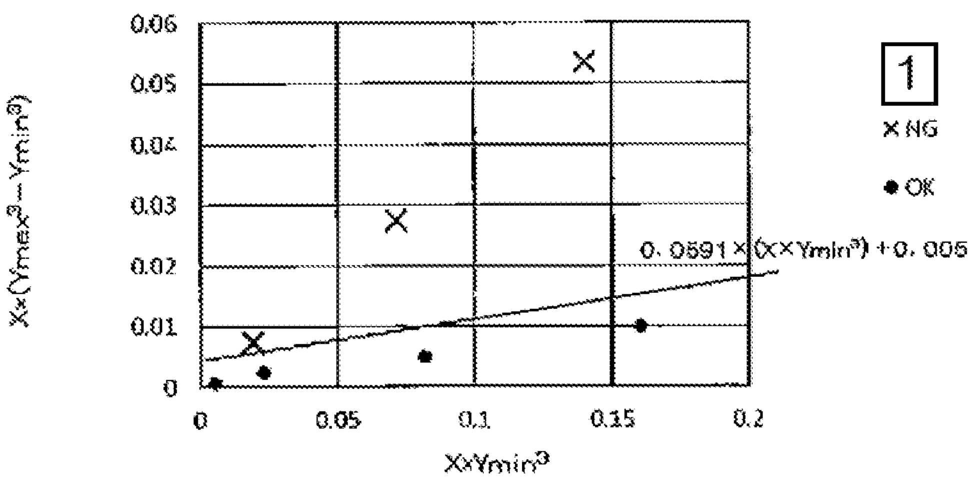
1 FLATNESS AFTER HEATING

BIAXIALLY ORIENTED POLYESTER FILM

TECHNICAL FIELD

The present invention relates to a polyester film excellent in thermoformability and elasticity.

BACKGROUND ART

Aromatic polyesters typified by polyethylene terephthalate (PET) are also crystalline resins and thus have a high elastic modulus, are excellent in elasticity as a film, and are widely used in various substrate applications. However, the followability of polyester resins is not always sufficient in thermoforming using molds and the like, and improvement thereof has been desired.

Therefore, a technology has been disclosed in which a polyester film is fabricated to have at least a three-layer structure and the glass transition temperature of each layer is adjusted to impart flexibility (Patent Document 1).

For example, a large number of studies have been carried out to soften the polyester resins and enhance formability by copolymerizing glycol components including branched aliphatic glycols and alicyclic glycols and introducing the copolymers into the main chains (see Patent Documents 1 to 3, for example).

A membrane switch is one fabricated by disposing opposing contacts (electrodes) on the facing surfaces of two substrate films with a spacer interposed therebetween, and is one that can easily perform switching of conduction and insulation by being pressed down. A form of use is known in which a membrane switch is connected to a connector in order to connect a membrane switch to other electronic parts. In recent years, membrane switches have been often used as keyboard switches for calculators, personal computers, and the like and panel switches for various remote controls of TVs and VTRs. Since these membrane switches perform switching by repeated pressing, the substrate film thereof is required to exhibit resistance to permanent deformation. Conventionally, as a substrate film for membrane switches, PET films have been used because of their resistance to permanent deformation, close adhesive properties to electrodes, adhesive properties to printing, and the like.

PRIOR ART DOCUMENTS

Patent Documents

Patent Document 1: JP-A-2006-159541

SUMMARY OF THE INVENTION

Problems to be Solved by the Invention

In order for the membrane switch to operate without malfunction, it is important that the substrate film and the silver paste constituting electrodes are closely bonded and the substrate film that is the membrane switch and the molding resin that connects the connector are closely bonded. Therefore, silver pastes and molding resins in which special adhesives that improve adhesive properties to the substrate films are added have been used, but there is a problem that these materials lack versatility and thus it takes an extremely high cost, and polyester films exhibiting high adhesive properties to each of commonly used silver pastes and molding resins are required.

In the technology of prior document 1, the strength and elasticity are diminished while the formability is improved, it cannot be said that these properties are well-balanced, and these polyester films have a drawback that the applications thereof are limited. The polyester films have not been satisfactorily used in applications that are required to exhibit high elasticity, such as substrate films for membrane switches and separator films.

In the fabrication of substrate films for membrane switches and separator films that are required to exhibit high elasticity, there is a problem that poor flatness is caused by the distribution of elasticity in a polyester film when the polyester film is heated and conveyed. Poor flatness is a phenomenon in which a portion of the polyester film is bent and deformed to form a convex portion.

Furthermore, close adhesive properties to conductive pastes and pressure-sensitive adhesive resins are also required, and for example, it is required to improve release properties of the conductive pastes and cracking due to deformation of the polyester film during following.

An object of the present invention is to solve the problems of prior art and to provide a biaxially oriented polyester film, which satisfies all of the formability during thermoforming, film strength and elasticity, suppresses oligomer precipitation (whitening) due to heating during forming, a coating process of a conductive paste, and a coating process of a pressure-sensitive adhesive resin and the like, and enables production of a formed product, a label and the like without impairing the quality. Furthermore, the present invention provides a biaxially oriented polyester film in which the close adhesive properties between a polyester substrate and a conductive paste and a pressure-sensitive adhesive resin are improved, the close adhesion durability of a conductive paste and a pressure-sensitive adhesive resin when following a polyester film is improved, and poor flatness that may be caused during heating and conveyance processing is suppressed.

Means for Solving the Problems

[1] A biaxially oriented polyester film that satisfies the following (1) to (6):

(1) a content rate of an ester constituting unit derived from an isophthalic acid component is 0.5 mol % or more and 5.0 mol % or less with respect to 100 mol % of all ester constituting units in all polyester resins constituting the biaxially oriented polyester film;

(2) an amount of change in haze of the biaxially oriented polyester film, Δhaze {Δhaze=(haze after heating)−(haze before heating)} is 5.0% or less when the film is heated at 150° C. for 30 minutes;

(3) an intrinsic viscosity of the biaxially oriented polyester film is 0.59 dl/g or more and 0.65 dl/g or less;

(4) a storage modulus of the biaxially oriented polyester film at 150° C. is $5.0\times10^8$ [Pa] or more and $7.6\times10^8$ [Pa] or less as an average value of storage moduli in a machine direction and a transverse direction of the film when a polyester film having a width of 5 mm is subjected to measurement at a grip interval of 30 mm using a dynamic viscoelasticity measuring instrument under conditions of a tensile mode, a frequency of 10 Hz, and a rate of temperature increase of 5° C./min;

(5) an acid value of the biaxially oriented polyester film is 40 eq/ton or more and 60 eq/ton or less; and (6) the following relational expression is satisfied:

$$X \times (Ymax^3 - Ymin^3) \leq 0.0591 \times (X \times Ymin^3) + 0.005$$

(where, X is a storage modulus at 170° C., and Y is a film thickness per 1000 mm in a transverse direction with Ymax as a maximum value and Ymin as a minimum value).

[2] In an aspect, the biaxially oriented polyester film, wherein a polyester resin recycled from PET bottles is contained at 50% by mass or more and 100% by mass or less with respect to 100% by mass of all polyester resins contained in the film.

[3] In an aspect, the biaxially oriented polyester film, wherein a change in acid value of the biaxially oriented polyester film as a substrate per 10,000 m in a machine direction is 2 eq/ton or less.

[4] In an aspect, the biaxially oriented polyester film, comprising a resin layer containing at least one resin selected from a polyester-based resin, a polyurethane-based resin, or an acrylic resin on at least one side of the polyester film.

[5] In an aspect, the biaxially oriented polyester film, wherein $X \times (Ymax^3 - Ymin^3)$ is 0.020 or less.

[6] In an aspect, a separator film comprising the biaxially oriented polyester film is provided.

[7] In an aspect, a formed product comprising the biaxially oriented polyester film is provided.

[8] In an aspect, there is provided a substrate film for membrane switches, comprising the biaxially oriented polyester film and a conductive layer provided on at least one surface of the biaxially oriented polyester film.

[9] In an aspect, there is provided a substrate film for membrane switches, comprising the biaxially oriented polyester film and a pressure-sensitive adhesive layer provided on at least one surface of the biaxially oriented polyester film.

[10] In an aspect, there is provided a membrane switch sheet comprising two substrate films for membrane switches and a spacer sheet provided between the two substrate films for membrane switches.

The present invention is excellent in thermoformability as well as has less oligomer precipitation (whitening) even under heating during forming and in a coating process of a conductive paste and a coating process of a pressure-sensitive adhesive resin and the like. Furthermore, it is possible to suppress a decrease in appearance quality and a decrease in productivity due to process contamination. The film is excellent in elasticity as well. Furthermore, it is possible to provide a biaxially oriented polyester film, which is suitably used in formed products, substrate films for membrane switches, separator films, and the like that are required to maintain the shape.

BRIEF DESCRIPTION OF THE DRAWINGS

FIG. 1 is a graph illustrating Examples 7 to 10 that satisfy a relational expression in a biaxially oriented polyester film according to an embodiment of the present invention and Comparative Examples 5 to 7 that do not satisfy the relational expression.

MODE FOR CARRYING OUT THE INVENTION

Hereinafter, the present invention will be described in detail.

(Substrate)

The substrate of the present invention is a polyester film (hereinafter, a biaxially oriented polyester film is also referred to as a "substrate" or a "substrate film"). The polyester film in the present invention may be a film having a single layer configuration or a film having a multilayer configuration. The polyester film may be a film composed of one or more polyester resins, or may be a polyester film containing two or more polyester resins in an aspect of multilayer configuration. The polyester film in the present invention may have, for example, a structure having first skin layer/core layer/second skin layer.

In the biaxially oriented polyester film including a conductive layer according to the present invention, a polyester film as a substrate (namely, a substrate not including a conductive layer) is simply referred to as a polyester film in some cases.

The main constituent of the polyester resin constituting the film is polyethylene terephthalate. As a dicarboxylic acid component of polyester, it is preferable that the content rate of an ester constituting unit derived from an isophthalic acid component is 0.5 mol % or more and 5.0 mol % or less with respect to 100 mol % of all ester constituting units in the polyester resins. As other components, for example, those containing ester constituting units derived from arbitrary diol components typified by ethylene glycol and diethylene glycol are used. Hereinafter, the ester constituting unit derived from an isophthalic acid component is simply referred to as an isophthalic acid component in some cases. The other component may be an ester constituting unit derived from a terephthalic acid component.

The content rate of the ester constituting unit derived from an isophthalic acid component is 0.5 mol % or more, more preferably 0.7 mol % or more, still more preferably 0.9 mol % or more. A content rate of 0.5 mol % or more is preferable since thermoformability is favorable. The content rate of the ester constituting unit derived from an isophthalic acid component is 5.0 mol % or less, more preferably 4.0 mol % or less, still more preferably 3.5 mol % or less, for example, is 2.5 mol % or less, and may be 2.0 mol % or less. A content rate of 5.0 mol % or less is preferable since the decrease in crystallinity is small and the thermal shrinkage is low.

In the polyester film of the present invention, the intrinsic viscosity of at least one or more resins contained in the film is preferably in a range of 0.57 dl/g or more and 1.0 dl/g or less. It is preferable that the intrinsic viscosity is 0.57 dl/g or more since the obtained film is less likely to break and film fabrication is likely to be stably performed. Meanwhile, it is preferable that the intrinsic viscosity is 1.0 dl/g or less since the increase in filtration pressure of the molten fluid is not too large and film fabrication is likely to be stably performed.

In an aspect, the intrinsic viscosity of at least one or more resins contained in the polyester film is preferably 0.59 dl/g or more and 0.8 dl/g or less.

Regardless of whether the polyester film has a single layer configuration or a laminated configuration, the intrinsic viscosity of the polyester film (substrate film) is 0.59 dl/g or more as a whole. The limiting viscosity of the film is still more preferably 0.60 dl/g or more as a whole. It is preferable that the limiting viscosity of the film is 0.59 dl/g or more as a whole since it is possible to suppress thermal deterioration during thermoforming and to maintain the strength and elastic modulus of the formed product.

Meanwhile, when the intrinsic viscosity of the substrate film is 0.65 dl/g or less as a whole, the polyester film can be fabricated with favorable workability. A film having a limiting viscosity of 0.65 dl/g or less as a whole film is preferable since the film is also excellent in thermoformability.

In an aspect, the intrinsic viscosity of the polyester film is preferably 0.60 dl/g or more and 0.65 dl/g or less as a whole. In the present invention, it is desirable to measure the intrinsic viscosity of the substrate film before the conductive layer is provided. The measurement may also be performed on a substrate from which the conductive layer has been removed using a known technology.

In the present invention, it is preferable to use a polyester resin recycled from PET bottles. The lower limit of the content rate of a polyester resin recycled from PET bottles with respect to the polyester film is preferably 50% by mass, more preferably 60% by mass, still more preferably 70% by mass. It is preferable that the content rate is 50% by mass or more since the formability becomes favorable by copolymerization of the isophthalic acid component of the polyester. Furthermore, in terms of utilization of recycled resin, a high content rate is preferable from the viewpoint of contribution to environmental protection. The upper limit of the content rate of a polyester resin recycled from PET bottles is preferably 100% by mass.

A membrane switch sheet is a sheet-like membrane switch. The membrane switch sheet has a so-called three-layer structure, and the membrane switch sheet is configured to include an upper PET film sheet, a lower PET film sheet, and a spacer sheet interposed (provided) between the upper PET film sheet and the lower PET film sheet. In an aspect, the substrate film for membrane switches according to the present invention can be applied to the upper PET film sheet and/or lower PET film sheet.

Pressure-sensitive adhesive layers are provided on both surfaces of the spacer sheet. The upper PET film sheet and the lower PET film sheet are attached to the spacer sheet with a pressure-sensitive adhesive layer interposed therebetween to configure a membrane switch sheet having a three-layer structure.

A circuit pattern and a fixed contact pattern are formed on the lower PET film sheet, and a movable contact pattern is formed on the upper PET film sheet to face the fixed contact pattern. The spacer sheet is for separating and facing the lower PET film sheet and the upper PET film sheet, and a switching hole is provided at a portion where the fixed contact pattern (conductive layer) of the lower PET film sheet and the movable contact pattern (conductive layer) of the upper PET film sheet face each other to cope with each key switch device. For example, the spacer sheet is configured to include a PET film provided with a switching hole. The configuration of the membrane switch sheet is known, and detailed explanation thereof will be omitted here.

The thickness of the polyester film of the present invention is preferably 38 to 75 μm. It is preferable that the membrane switch sheet has a three-layer structure in which the substrate PET film for the upper electrode in the membrane sheet is 60 μm, the substrate PET film sheet for the lower electrode is 75 μm, and the substrate PET film for the spacer sheet between the upper layer and the lower layer is 38 μm since the feel when the key switch is pressed is favorable. Alternatively, the membrane switch sheet may have a three-layer structure in which each substrate PET film has a thickness of 50 μm.

The surface of the polyester film of the present invention may be smooth or have unevenness. From the viewpoint of improving handling properties and conductive paste printability and in order to impart a certain degree of slipperiness, it is preferable that unevenness is formed.

The haze of the polyester film as a substrate is preferably 5% or less, still more preferably 3% or less, most preferably 2% or less. A haze of 5% or less is suitable for a case where non-light diffusing properties are required in a luminescent keyboard. The lower limit of haze is not limited, but may be 0.1% or more or 0.3% or more.

As a method for forming irregularities on the polyester surface, particles may be blended in the polyester resin layer of the outer layer or irregularities may be formed by applying a resin solution containing particles during film formation.

A known method may be adopted as a method for blending particles in the polyester resin. For example, particles may be added at an arbitrary stage in the production of polyester, but it is preferable to add particles as a slurry dispersed in ethylene glycol or the like at the stage of esterification or at the stage after the termination of transesterification reaction and before the start of polycondensation reaction and to conduct the polycondensation reaction. Particles may also be blended by a method in which a slurry of particles dispersed in ethylene glycol, water or the like is blended with a polyester raw material using a kneading extruder with a vent, a method in which dried particles are blended with a polyester raw material using a kneading extruder, or the like.

Among these, a method is preferable in which one obtained by homogenously dispersing inorganic particles of aggregates in a monomer liquid to be a part of the polyester raw material and then filtering the dispersion is added to the rest of the polyester raw material before, during, or after the esterification reaction. According to this method, since the monomer liquid has a low viscosity, homogenous dispersion of particles and high-precision filtration of slurry may be easily performed as well as particles exhibit favorable dispersibility when added to the rest of the raw material and new aggregates are less likely to be generated. From this point of view, it is particularly preferable to add particles to the rest of the raw material in a low temperature state before the esterification reaction.

As the kind of particles to be blended, in addition to inorganic lubricants such as silica, calcium carbonate and alumina, heat resistant organic particles may be preferably used. Among these, silica and calcium carbonate are more preferable. The transparency and slipperiness may be exerted by these lubricants.

The polyester film may contain various additives as long as the preferable range of total light transmittance is maintained. Examples of the additives include an antistatic agent, an UV absorber, and a stabilizer.

The total light transmittance of the polyester film is preferably 85% or more, more preferably 87% or more. When the transmittance is 85% or more, it is possible to secure sufficient color development of a luminescent keyboard. It can be said that it is more preferable as the total light transmittance of the polyester film is higher, but the total light transmittance may be 99% or less, or 97% or less.

The surface of the polyester film of the present invention can be subjected to a treatment for improving close adhesive properties to the conductive layer, the resin that forms a hard coat layer, the ink layer, and the pressure-sensitive adhesive resin layer.

Examples of the surface treatment method include sandblasting, solvent treatment and the like to form irregularities, corona discharge treatment, electron beam irradiation treatment, plasma treatment, ozone/ultraviolet irradiation treatment, flame treatment, chromic acid treatment, and oxidation treatment such as hot air treatment, which may be used without particular limitation.

Close adhesive properties may also be improved by providing an easily adhesive resin layer on the surface of the polyester film. As the easily adhesive resin layer, polyester-based resins, polyurethane-based resins, acrylic resins, polyether-based resins, and the like may be used without particular limitation. A crosslinked structure may be formed in order to improve the close adhesion durability of these easily adhesive layers. By containing a crosslinking agent, it is possible to further improve close adhesive properties at a high temperature and a high humidity. Specific examples of the crosslinking agent include urea-based, epoxy-based, melamine-based, isocyanate-based, oxazoline-based, and carbodiimide-based crosslinking agents. In order to promote a crosslinking reaction, a catalyst and the like may be appropriately used, if necessary.

The easily adhesive resin layer may contain lubricant particles in order to impart slipperiness to the surface. The particles may be inorganic particles or organic particles, and are not particularly limited, but examples thereof include (1) inorganic particles such as silica, kaolinite, talc, light calcium carbonate, heavy calcium carbonate, zeolite, alumina, barium sulfate, carbon black, zinc oxide, zinc sulfate, zinc carbonate, zirconium oxide, titanium dioxide, aluminum silicate, diatomaceous earth, calcium silicate, aluminum hydroxide, calcium carbonate, magnesium carbonate, calcium phosphate, magnesium hydroxide, and barium sulfate, and (2) organic particles such as acrylic or methacrylic, vinyl chloride-based, vinyl acetate-based, nylon, styrene/acrylic, styrene/butadiene-based, polystyrene/acrylic, polystyrene/isoprene-based, polystyrene/isoprene-based, methyl methacrylate/butyl methacrylate-based, melamine-based, polycarbonate-based, urea-based, epoxy-based, urethane-based, phenol-based, diallyl phthalate-based, and polyester-based particles, but silica is particularly preferably used in order to impart proper slipperiness to the coating layer.

The average particle diameter of particles is preferably 10 nm or more, more preferably 20 nm or more, and still more preferably 30 nm or more. It is preferable that the average particle diameter of particles is 10 nm or more since the particles are less likely to aggregate and slipperiness may be secured.

The average particle diameter of the particles is preferably 1000 nm or less, more preferably 800 nm or less, still more preferably 600 nm or less. It is preferable that the average particle diameter of the particles is 1000 nm or less since the transparency is maintained and the particles do not fall off.

The acid value of the polyester film (the biaxially oriented polyester film) as a substrate is 40 eq/ton or more, more preferably 43 eq/ton or more, for example 45 eq/ton or more, still more preferably 47 eq/ton or more, for example 49 eq/ton or more from the viewpoint of further improving the close adhesive force between the film and the resin forming a hard coat layer and the easily adhesive resin layer coated with an ink layer. Meanwhile, the acid value is 60 eq/ton or less. When the acid value exceeds 60 eq/ton, problems such that the film is likely to deteriorate arise.

The method for measuring the acid value of the polyester film is as described below.

Here, the acid value of the polyester film of the present invention may be derived from the fact that the content rate of the ester constituting unit derived from an isophthalic acid component is 0.5 mol % or more and 5.0 mol % or less with respect to 100 mol % of all ester constituting units in all polyester resins constituting the biaxially oriented polyester film.

The change in acid value per 10,000 m in the machine direction of the polyester film as a substrate is preferably 2 eq/ton or less from the viewpoint of film forming stability and quality stability. For example, the change in acid value may be 0 or 0.1 eq/ton or more and 2 eq/ton or less. In the present invention, since the change in acid value shows such conditions, the close adhesive force to the conductive layer can be further improved. Furthermore, not only favorable close adhesive properties may be maintained after the polyester film has been wound but also stable quality may be maintained and disposal of film may be diminished.

In an aspect, the surface free energy of at least one surface of the biaxially oriented polyester film is 45 mN/m or more. For example, in a case where an easily adhesive resin layer or a conductive layer is provided, the surface free energy of the easily adhesive resin layer is preferably 45.0 Nm/m or more, more preferably 46.0 Nm/m or more. In the present invention, since the surface free energy shows such conditions, the close adhesive force between the easily adhesive resin layer and the resin that forms a hard coat layer and the conductive layer can be further improved, and stable quality may be maintained and disposal of film may be diminished.

For example, the surface free energy may be 45 mN/m or more and 70 mN/m or less, 46 mN/m or more and 60 mN/m or less, or for example, 46 mN/m or more and 55 mN/m or less.

(Properties of Polyester Film)

When the polyester film as a substrate is heated at 150° C. for 30 minutes, the amount of change in haze of the film, Δhaze {Δhaze=(haze after heating)−(haze before heating)} is preferably 5.0% or less, for example, 2.0% or less, more preferably 1.5% or less, still more preferably 1.0% or less. It is preferable that the Δhaze is 5.0% or less since oligomer precipitation is suppressed during thermoforming of the film and there is no possibility that the close adhesive properties between the polyester film according to the present invention and the conductive paste are diminished. In particular, it is preferable that the Δhaze is 2.0% or less since oligomer precipitation is suppressed when functional resins such as a pressure-sensitive adhesive are applied/dried, and functionality such as stickiness is effectively exerted. It is more preferable as the Δhaze is smaller, and the lower limit of Δhaze is 0%, for example, 0.01 or more, and may be 0.02 or more.

The storage modulus at 150° C. is preferably $5.0\times10^8$ [Pa] or more and $7.6\times10^8$ [Pa] or less as an average value of storage moduli in the machine direction (MD direction) and transverse direction (TD direction) of the film when the polyester film (biaxially oriented polyester film) as a substrate in the present invention is subjected to the measurement at a width of 5 mm and a grip interval of 30 mm using a dynamic viscoelasticity measuring instrument under conditions of a tensile mode, a frequency of 10 Hz, and a rate of temperature increase of 5° C./min. The evaluation is performed on the biaxially oriented polyester film on which the conductive layer is not yet formed.

In a case where the storage modulus of the polyester film is in the above range, the film is not deformed during the film conveyance or winding process including the heating process and the handling properties are favorable. When the storage modulus is less than the lower limit value, the film is deformed during the film conveyance or winding process including the heating process, resulting in poor flatness.

When the storage modulus exceeds the upper limit value, the feel when the key switch is pressed decreases.

In an aspect, the storage modulus at 150° C. is $5.5\times10^8$ [Pa] or more and $7.6\times10^8$ [Pa] or less, for example, is preferably $5.9\times10^8$ [Pa] or more and $7.6\times10^8$ [Pa] or less. As the storage modulus is in such a range, the effects are more likely to be exerted.

FIG. 1 is a graph illustrating Examples 7 to 10 that satisfy the relational expression in the biaxially oriented polyester film according to an embodiment of the present invention and Comparative Examples 5 to 7 that do not satisfy the relational expression.

The inventors of the present application have found out the effect that the flatness of the polyester film after heat processing is secured if the relation that can be calculated from the storage modulus X of the polyester film at 170° C. in the transverse direction (TD direction) when the polyester film as a substrate in the present invention is subjected to the measurement at a width of 5 mm and a grip interval of 20 mm using a dynamic viscoelasticity measuring instrument under conditions of a tensile mode, a frequency of 1 Hz, and a rate of temperature increase of 5° C./min and the maximum value Ymax and minimum value Ymin of film thickness per 1000 mm in the transverse direction (TD direction) of the film satisfies $X\times(Ymax^3-Ymin^3)\leq0.0591\times(X\times Ymin^3)+0.005$ (for example, see OK in FIG. 1). For this reason, it is preferable that the polyester film satisfies this relational expression.

Meanwhile, the inventors of the present application have found out that the flatness of the polyester film after heat processing is poor if the left side of this relational expression exceeds the right side (for example, see NG in FIG. 1). Poor flatness refers to a phenomenon in which a portion of the polyester film is bent and deformed to form a convex portion during the film conveyance or winding process including the heating process.

Here, the storage modulus X and the cube of the thickness Y represent the elastic force. In other words, the relational expression indicates that flatness of the polyester film after heat processing is favorable if the variation in film thickness per 1000 mm in the transverse direction (TD direction) of the film is small (more precisely, if the left side is equal to or less than the right side). In addition, the relational expression indicates that flatness of the polyester film after heat processing is favorable if the variation in elastic force per 1000 mm in the transverse direction (TD direction) of the film is small (more precisely, if the left side is equal to or less than the right side). This relational expression is an equation calculated from the results of a plurality of experiments including Examples 7 to 10 and Comparative Examples 5 to 7.

The inventors of the present application have considered that the above effects are determined by the distribution of elastic force (buckling limit) that attempts to resist the shrinkage stress that causes the polyester film to shrink in the transverse direction during heat processing. In other words, since the portion where the shrinkage stress exceeds the buckling limit shrinks and the portion where the shrinkage stress is less than the buckling limit does not shrink, the inventors of the present application think that the distribution of shrunk portions and non-shrunk portions is a main cause of deterioration in the flatness of polyester films.

It has been announced as a research result before the filing of this application that the elastic force (buckling limit) is proportional to the storage modulus X and the cube of the thickness Y (for example, see Hiromu Hashimoto, Theory and Application of Web Handling, Converting Technical Institute, 2018, p. 54-67).

The inventors of the present application have found out that the polyester film is excellent in close adhesive properties to the conductive layer in a case where $X\times(Ymax^3-Ymin^3)$ is 0 or more and 0.020 or less. $X\times(Ymax^3-Ymin^3)$ is preferably 0 or more and 0.020 or less, more preferably 0 or more and 0.015 or less, particularly preferably 0 or more and 0.010 or less.

Similarly, the inventors of the present application have found out that the polyester film is excellent in close adhesive properties to the conductive layer in a case where $(Ymax-Ymin)$ is 0 or more and 0.005 or less. $(Ymax-Ymin)$ is preferably 0 or more and 0.005 or less, more preferably 0 or more and 0.002 or less.

(Method for Fabricating Polyester Film)

Next, the method for fabricating the polyester film will be described in detail, but the method is not limited to these. The method does not limit the number of layers, such as a single layer configuration and a multilayer configuration.

Polyester resin pellets are mixed at a predetermined proportion and dried, then supplied into a known extruder for melt lamination, extruded into a sheet shape from a slit-shaped die, and cooled and solidified on a casting drum to form an unstretched film. In the case of a single layer, one extruder is sufficient. However, in the case of fabricating a film having a multilayer configuration, using two or more extruders and two or more layers of manifolds or joining blocks (for example, joining blocks with square joining sections), a plurality of film layers constituting each outermost layer may be laminated, a sheet composed of two or more layers may be extruded from the mouthpieces, and cooled on a casting drum to form an unstretched film.

In this case, during melt extrusion, it is preferable to perform high-precision filtration in order to remove foreign substances contained in the resin at an arbitrary location where the molten resin is kept at about 280° C. The filter medium used for high-precision filtration of molten resin is not particularly limited, but a filter medium composed of sintered stainless steel is preferable since the filter medium is excellent in removing aggregates mainly composed of Si, Ti, Sb, Ge, and Cu and organic substances having high melting points.

Furthermore, the size of particles filtered through the filter medium (initial filtration efficiency of 95%) is preferably 50 μm or less, particularly preferably 20 μm or less. When the size of particles filtered through the filter medium (initial filtration efficiency of 95%) exceeds 50 μm, foreign substances having a size of 50 μm or more may not be sufficiently removed. It is preferable to perform high-precision filtration on the molten resin using a filter medium affording a size of particles filtered through the filter medium (initial filtration efficiency of 95%) of 50 μm or less for obtaining a film with few projections due to coarse particles although the productivity may decrease in this case.

More specifically, as described above, PET pellets containing particles intended to impart easy lubricating properties are sufficiently vacuum-dried, then supplied into an extruder, melt extruded into a sheet shape at about 280° C., and cooled and solidified to form an unstretched PET sheet. The obtained unstretched sheet is stretched 2.5 to 5.0 times in the machine direction using rolls heated to 80° C. to 120° C. to obtain a uniaxially oriented PET film.

In a case where a functional layer is provided on at least one side of the polyester film as a substrate, another layer may be interposed between the substrate and the functional layer, or the functional layer may be provided directly on the polyester film substrate. In the present invention, since the substrate has various features described in this specification, the functional layer can be directly formed on the polyester film as a substrate. A known technology can be adopted as a method for forming the functional layer. For example, the functional layer may be imparted after a uniaxially oriented PET film has been obtained, or the functional layer may be imparted after the substrate has been biaxially oriented.

In the obtained biaxially oriented polyester film of the present invention, the substrate and the functional layer can exhibit high close adhesive properties so as not to peel off from each other during normal use, but the functional layer can be removed in a recycling process and the like.

As the method for providing an easily pressure-sensitive adhesive resin layer on the surface of the polyester film, a coating liquid may be applied to at least one surface of the polyester film to form the easily pressure-sensitive adhesive resin layer at any stage in the polyester film fabricating process. For example, after a uniaxially oriented PET film is obtained, the easily pressure-sensitive adhesive resin layer may be formed on one surface or both surfaces of the polyester film. The solid concentration in the resin composition in the coating liquid is preferably 2% to 35% by mass, particularly preferably 4% to 15% by mass.

As the method for providing the easily pressure-sensitive adhesive resin layer on the surface of the polyester film, the easily pressure-sensitive adhesive resin layer may be formed by a coating technique in a known arbitrary method. Examples thereof include a reverse roll-coating method, a gravure coating method, a kiss coating method, a reverse kiss coating method, a die coating method, a roll brushing method, a spray coating method, an air knife coating method, a wire bar coating method, a pipe doctor method, an impregnation coating method, and a curtain coating method. The application may be performed using these methods singly or in combination.

Next, the ends of the film are gripped with clips, and the film is guided to a hot air zone heated to 80° C. to 180° C., preheated, and then stretched 2.5 to 5.0 times in the transverse direction. Subsequently, the stretched film is guided to a heat treatment zone at 160° C. to 240° C. and subjected to a heat treatment for 1 to 60 seconds to complete the crystalline orientation. During this heat treatment step, a relaxation treatment of 18 to 12% may be performed in the transverse direction or the machine direction, if necessary.

In an aspect, the present invention provides a formed product including the biaxially oriented polyester film.

The biaxially oriented polyester film according to the present invention is suitably used for thermoforming using a mold. In a case of performing processing including a heating process using the biaxially oriented polyester film of the present invention, since oligomer precipitation (whitening) less occur even under heating compared to a case of using a conventional polyester film, a decrease in appearance quality and a decrease in productivity due to process contamination may be suppressed. Forming is possible at a low forming temperature, and there is a remarkable effect that the finishing properties of the formed product is improved. Furthermore, since the formed product formed in this way exhibits excellent elasticity and shape stability when used in a normal temperature atmosphere, and the burden on the environment is small, the formed product may be suitably used as formed members such as nameplates for household appliances, nameplates for motor vehicles, dummy cans, building materials, decorative plates, decorative steel plates, transfer sheets, membrane switch sheets, and separator films.

Since the biaxially oriented polyester film of the present invention has little oligomer precipitation (whitening) even under heating in the coating process of a conductive paste, a pressure-sensitive adhesive resin and the like, decreases in workability and appearance quality do not occur, and the film is useful for an application of pressure-sensitive adhesive labels that are used by being attached to articles such as plastic formed products, steel plates, and cans and an application of keyboards. The film is also excellent in elasticity, and is particularly useful for applications of POP pressure-sensitive adhesive labels with an upright display portion and membrane switch sheets, which are required to maintain the shape stably. Since the film exhibits various favorable printabilities and favorable close adhesive properties to a pressure-sensitive adhesive, it is possible to provide a substrate film, which is excellent in appearance and design and is also excellent in close adhesive properties between the pressure-sensitive adhesive layer and conductive layer and the article and durability.

For example, the pressure-sensitive adhesive label is a label having a pressure-sensitive adhesive layer on at least one surface of the biaxially oriented polyester film.

For example, a substrate film for membrane switches includes a pressure-sensitive adhesive layer or a conductive layer provided on at least one surface of the biaxially oriented polyester film.

In an aspect, the present invention provides a substrate film for membrane switches including the biaxially oriented polyester film and a conductive layer provided on at least one surface of the biaxially oriented polyester film.

In an aspect, the present invention provides a substrate film for membrane switches including the biaxially oriented polyester film and a pressure-sensitive adhesive layer provided on at least one surface of the biaxially oriented polyester film.

In an aspect, the present invention provides a membrane switch sheet including two substrate films for membrane switches and a spacer sheet provided between the two substrate films for membrane switches.

In an aspect, there is provided the membrane switch sheet in which spacer sheet has a switching hole at a portion where the conductive layer of the substrate film for membrane switches provided on the lower side and the conductive layer of the substrate film for membrane switches provided on the upper side face each other.

As the silver paste that forms electrodes in the membrane switch, a silver paste, which is usually commercially available as one for electrode formation and contains silver as a main component and a small amount of a binder component formed of a resin, may be used. The silver paste is formed by performing printing on one surface of the substrate film and then heating and solidification at 140° C. to 170° C. for 30 to 60 minutes. The molding resin that molds the connector onto the substrate film is not particularly limited as long as it is a general molding resin, which is used as a sealing material for semiconductors and contains an epoxy resin as a main component.

EXAMPLES

Next, the present invention will be described using Examples and Comparative Examples. First, the evaluation methods of property values used in the present invention are presented below.

(1) Content Rates of Ester Constituting Units Derived from Terephthalic Acid and Isophthalic Acid Contained in Raw Material Polyester and Polyester Constituting Film A sample solution was prepared by dissolving a sample in a mixed solution of heavy chloroform and trifluoroacetic acid (volume ratio: 9/1), and proton NMR was measured using NMR ("GEMINI-200" manufactured by Varian). The peak intensity of a predetermined proton was calculated, and the content rate (mol %) of the terephthalic acid-derived ester constituting unit and the isophthalic acid-derived ester constituting unit in 100 mol % of the ester constituting units was calculated.

(2) Haze

Measured in conformity with JIS K 7136 "Determination of haze of transparent plastic materials". A haze meter NDH5000 manufactured by Nippon Denshoku Industries Co., Ltd. was used as a measuring instrument.

(3) Evaluation of Amount of Change in Haze (Δhaze)

The film was cut into 50 mm squares, and the haze before heating was measured in conformity with JIS K 7136 "Determination of haze of transparent plastic materials". A haze meter NDH5000 manufactured by Nippon Denshoku Industries Co., Ltd. was used as a measuring instrument. After measurement, the film was set in an oven heated to 150° C. and taken out after an elapse of 30 minutes, and the haze of the film after subjected to the heating was measured in the same manner as above to acquire the haze after heating. The difference in haze before and after heating was defined as Δhaze.

Δhaze (%)=(haze after heating)−(haze before heating)

(4) Limiting Viscosity

The substrate film or polyester resin was crushed, dried, and then dissolved in a mixed solvent of phenol/tetrachloroethane=60/40 (mass ratio). This solution was centrifuged to remove inorganic particles, the flow time of the solution having a concentration of 0.4 (g/dl) at 30° C. and the flow time of only the solvent were measured using an Ubbelohde viscometer, the limiting viscosity was calculated from the ratio of these times using the Huggins equation assuming that the Huggins constant is 0.38. In the case of a laminated film, the limiting viscosity of each layer alone was evaluated by scraping off the corresponding polyester layer of the film according to the laminated thickness.

(5) Storage Modulus

The storage modulus (E') of the substrate film in the machine direction (MD direction) and transverse direction (TD direction) at 150° C. was determined using a dynamic viscoelasticity measuring instrument (DVA225 manufactured by IT KEISOKUSEIGYO Co., Ltd.) under the following conditions. The measurement was performed in a tensile mode.

(a) Sample width: 5 mm (b) Sample grip interval: 30 mm
(c) Measured temperature range: 20° C. to 250° C. (d) Frequency: 10 Hz
(e) Rate of temperature increase: 5° C./min (6) Storage Modulus at 170° C.

The storage modulus (E') of the substrate film at 170° C. in the transverse direction (TD direction) was determined using a dynamic viscoelasticity measuring instrument (TA7000 manufactured by Hitachi High-Tech Science Corporation) under the following conditions. The measurement was performed in a tensile mode.

(a) Sample width: 5 mm (b) Sample grip interval: 20 mm
(c) Measured temperature range: 30° C. to 200° C. (d) Frequency: 1 Hz
(e) Rate of temperature increase: 5° C./min (7) Film Thickness A wide strip-shaped film sample having a dimension of 40 mm in the machine direction of the film×a dimension of 1100 mm in the transverse direction of the film was sampled from the film roll, and the thickness was continuously measured along the transverse direction of the film sample at a measurement speed of 5 m/min using a continuous contact thickness gauge manufactured by MIKURON Measuring Instruments Co., Ltd. (measured length was 1000 mm). The maximum thickness during measurement was denoted as Ymax and the minimum thickness as Ymin.

(8) Film Flatness after Heating

The substrate film was heated at a heating temperature of 170° C. for a heating time of 3 minutes by a roll-to-roll method. After being cooled, the substrate film was unwound, and the flatness of the substrate film was visually evaluated at an inclined angle of 45°.

○: Flatness is not poor

Δ: Flatness is partially poor (partially poor flatness refers to a phenomenon in which a portion of the substrate film is bent and deformed to form a convex portion)

(7) Acid Value (Sample Preparation)

A sample was crushed, vacuum-dried at 70° C. for 24 hours, and weighed in a range of 0.20±0.0005 g using a balance. The mass at that time was denoted as W (g). Into a test tube, 10 ml of benzyl alcohol and the weighed sample were added, the test tube was immersed in a benzyl alcohol bath heated to 205° C., and the sample was dissolved while the solution was stirred with a glass rod. Samples when the dissolution time was set to 3 minutes, 5 minutes, and 7 minutes were denoted as A, B, and C, respectively. Next, a new test tube was prepared, only benzyl alcohol was charged in the test tube and treated according to the same procedure, and samples when the dissolution time was set to 3 minutes, 5 minutes, and 7 minutes were denoted as a, b, and c, respectively.

(Titration)

Titration is performed using a 0.04 mol/l potassium hydroxide solution (ethanol solution) of which the factor is known in advance. Phenol red is used as the indicator, and the titer (ml) of the potassium hydroxide solution is determined by taking a point at which the color changes from yellowish green to light red as the end point. The titers of samples A, B, and C are denoted as XA, XB, and XC (ml), respectively. The titers of samples a, b, and c are denoted as Xa, Xb, and Xc (ml), respectively.

(Calculation of Acid Value)

The titer V (ml) at the dissolution time of 0 minutes was determined by the method of least squares using the titers XA, XB, and XC for the corresponding dissolution times. Similarly, the titer V0 (ml) was determined using Xa, Xb, and Xc. Next, the acid value was determined according to the following equation. The values presented in Table 2 are average values of measurement results of acid value.

$$\text{Acid value (eq/ton)} = [(V - V0) \times 0.04 \times NF \times 1000]/W$$

NF: Factor of 0.04 mol/potassium hydroxide solution

W: Sample weight (g)

(8) Close Adhesive Properties to UV Ink

Printing was performed on the coating liquid (D) applied layer of the polyester film using UV ink [manufactured by T&K TOKA Corporation, trade name "BEST CURE UV161

Indigo S"] and a printing machine [trade name "RI Tester" manufactured by Mei Seisakusho Co., Ltd.]. Next, the film coated with the ink layer was irradiated with ultraviolet rays at 40 $mJ/cm^2$ using a high pressure mercury lamp to cure the ultraviolet curing ink. Next, using a cutter guide having a gap interval of 2 mm, 100 square-shaped cuts, which penetrate the ink layer and reach the film substrate, are made on the ink layer surface. Next, cellophane pressure-sensitive adhesive tape (No. 405 manufactured by NICHIBAN Co., Ltd.; width of 24 mm) is attached to the square-shaped cut surface and completely stuck by being rubbed with an eraser. After that, the peeled off from the ink layer surface of the ink laminated film, the number of squares peeled off from the ink layer or coating liquid (D) applied layer surface of the ink laminated film is visually counted, and the close adhesive properties between the ink layer or coating liquid (D) and the film substrate is determined from the following equation. Among the squares, a square that is partially peeled off is also counted as a square peeled off. It is regarded as pass when the close adhesive properties to ink is 100(%).

(9) Close Adhesive Properties to Conductive Paste (Conductive Layer)

A silver paste (trade name: EN4277, manufactured by Hitachi Chemical Co., Ltd.) was printed (thickness: 10 μm) on the surface of a polyester film, and was heated and solidified at 150° C. for 30 minutes. Next, using a cutter guide having a gap interval of 2 mm, 100 square-shaped cuts, which penetrate the conductive layer and reach the film substrate, are made on the conductive layer surface. Next, cellophane pressure-sensitive adhesive tape (No. 405 manufactured by NICHIBAN Co., Ltd.; width of 24 mm) is attached to the square-shaped cut surface and completely stuck by being rubbed with an eraser. After that, the peeled off from the conductive layer surface of the conductive laminated film, the number of squares peeled off from the conductive layer of the conductive laminated film or the surface of the polyester film is visually counted, and the close adhesive properties between the conductive layer and the film substrate are determined from the following equation. Among the squares, a square that is partially peeled off is also counted as a square peeled off. It is regarded as pass when the close adhesive properties to conductive paste are 100(%).

(9) Film Acid Value Distribution in Machine Direction

The film acid value at 1000 m in the machine direction of the obtained polyester film was measured at 5 points at intervals of 2000 m, and the value obtained by subtracting the minimum value among the measured values from the maximum value was calculated.

(10) Surface Free Energy

The contact angles: θw and θy of water, whose surface tension is known, and methylene iodide on the substrate film or resin described in the present invention were measured using a contact angle meter (model CA-X, manufactured by Kyowa Interface Science Co., Ltd.) under conditions of 25° C. and 50% RH. Using these measured values, the surface tension γs of the substrate film or resin described in the present invention was calculated as follows.

The surface free energy γs is the sum of the dispersive component γsd and the polar component γsp. In other words, $$\gamma s = \gamma sd + \gamma sp \quad \text{(Equation 1)}$$

From Young's equation, $$\gamma s = \gamma sw + \gamma w \times \cos\theta w \quad \text{(Equation 2)}$$

$$\gamma s = \gamma sy + \gamma y \times \cos\theta y \quad \text{(Equation 3)}$$

Here, γsw is the tension acting between the film or resin and water, γsw is the tension acting between the film or resin and methylene iodide, γw is the surface tension of water, and γy is the surface tension of methylene iodide.

From Fowkes equation, $$\gamma sw = \gamma s + \gamma w - 2 \times (\gamma sd \times \gamma wd)\,1/2 - 2 \times (\gamma sp \times \gamma wp)\,1/2 \quad \text{(Equation 4)}$$

$$\gamma sy = \gamma s + \gamma y - 2 \times (\gamma sd \times \gamma yd)\,1/2 - 2 \times (\gamma sp \times \gamma yp)\,1/2 \quad \text{(Equation 5)}$$

Here, γwd is the dispersive component of the surface tension of water, γwp is the polar component of the surface tension of water, γyd is the dispersive component of the surface tension of methylene iodide, and γyp is the polar component of the surface tension of methylene iodide.

By solving the simultaneous equations of Equations 1 to 5, the surface tension γs=γsd+γsp of the substrate film or resin can be calculated. At this time, the surface tension of water (γw) used was 72.8 dyne/cm, the surface tension of methylene iodide (γy) used was 50.5 dyne/cm, the dispersive component (γwd) of the surface tension of water used was 21.8 dyne/cm, the polar component (γwp) of the surface tension of water used was 51.0 dyne/cm, the dispersive component (γyd) of the surface tension of methylene iodide used was 49.5 dyne/cm, and the polar component (γyp) of the surface tension of methylene iodide used was 1.3 dyne/cm.

(Production of Polyethylene Terephthalate Resin (I))

The temperature of the esterification reactor was raised, and at the time point at which the temperature reached 200° C., 86.4 parts by mass of terephthalic acid and 64.6 parts by mass of ethylene glycol were charged, and 0.017 parts by mass of antimony trioxide, 0.064 parts by mass of magnesium acetate tetrahydrate, and 0.16 parts by mass of triethylamine were charged as catalysts while stirring was performed. The temperature was then increased under pressure, and the pressure esterification reaction was conducted at a gauge pressure of 0.34 MPa and 240° C., the pressure in the esterification reactor was returned to normal pressure, and 0.014 parts by mass of phosphoric acid was added. Furthermore, the temperature was raised to 260° C. over 15 minutes, and 0.012 parts by mass of trimethyl phosphate was added. After 15 minutes, dispersion treatment was performed using a high pressure disperser, 0.1% by mass of sodium tripolyphosphate aqueous solution as sodium atoms was further added to the silica particles, and 35% of coarse particles were cut by centrifugal separation, an ethylene glycol slurry of silica particles, which were filtered through a metal filter having an opening of 5 μm and had an average particle diameter of 2.5 μm, was added at 0.2 parts by mass as a particle content. After 15 minutes, the obtained esterification reaction product was transferred to a polycondensation reactor, and polycondensation reaction was conducted at 280° C. under reduced pressure.

After the polycondensation reaction was completed, the reaction mixture was filtered through a NASLON filter having a 95% cut diameter of 5 μm, the product was extruded into a strand shape from the nozzle, and the strands were cooled and solidified using cooling water that had been previously filtered (pore size: 1 μm or less), and cut into pellets. The obtained polyethylene terephthalate resin (A) had an intrinsic viscosity of 0.62 dl/g and an oligomer content of 0.96% by mass, and did not substantially contain inert particles and internal precipitated particles. (Hereinafter abbreviated as PET resin (I).)

(Production of Polyethylene Terephthalate Resin (II))

A polyethylene terephthalate resin (II) containing no silica particles and having an intrinsic viscosity of 0.62 dl/g was obtained in the production of PET (A). (Hereinafter abbreviated as PET resin (II).)

(Production of Polyester Resin (III) Recycled from PET Bottles)

Flakes obtained by crushing PET bottles for beverages from which foreign substances such as remaining beverages and labels had been removed were melted in an extruder. Even finer foreign substances were filtered out two times while the filter was changed to one having a finer opening size in order, and far finer foreign substances were filtered out through a filter having the smallest opening size of 50 μm for the third time. The filtrate was extruded into a strand shape from the nozzle, and the strands were cooled and solidified using cooling water that had been previously filtered (pore size: 1 μm or less), and cut into pellets to obtain polyester resin (III). The proportion of ester constituting units in the obtained polyester resin (III) is that terephthalic acid-derived ester constituting unit/isophthalic acid-derived ester constituting unit=98.6/1.4 (mol %), and the limiting viscosity of the resin was 0.65 dl/g.

(Polymerization of Urethane Resin a Having Polycarbonate Structure)

In a four-necked flask equipped with a stirrer, a Dimroth condenser, a nitrogen inlet tube, a silica gel drying tube, and a thermometer, 27.5 parts by mass of hydrogenated m-xylylene diisocyanate, 6.5 parts by mass of dimethylol propanoic acid, 61 parts by mass of polyhexamethylene carbonate diol having a number average molecular weight of 1800, 5 parts by mass of neopentyl glycol, and 84.00 parts by mass of acetone as a solvent were charged, and stirred at 75° C. for 3 hours in a nitrogen atmosphere, and it was confirmed that the reaction liquid reached the predetermined amine equivalent weight. Next, 2.2 parts by mass of trimethylolpropane was charged, and the mixture was stirred at 75° C. for 1 hour in a nitrogen atmosphere, and it was confirmed that the reaction liquid reached the predetermined amine equivalent weight. After the reaction liquid was cooled to 40° C., 5.17 parts by mass of triethylamine was added to obtain a polyurethane prepolymer solution.

(Production of Water Dispersible Urethane Resin Solution (A))

Next, 450 g of water was added to a reaction vessel equipped with a homodisper capable of high speed stirring, the temperature was adjusted to 25° C., and the polyurethane prepolymer solution was added and dispersed in the water while stirring and mixing was performed at 2000 $min^{-1}$. Thereafter, acetone and part of the water were removed under reduced pressure to prepare a water dispersible urethane resin solution (A) having a solid content of 34% by mass.

(Polymerization of Blocked Isocyanate Crosslinking Agent B)

In a flask equipped with a stirrer, a thermometer and a reflux condenser, 23.27 parts by mass of 3,5-dimethylpyrazole (dissociation temperature: 120° C., boiling point: 218° C.) was added dropwise to 66.04 parts by mass of a polyisocyanate compound having an isocyanurate structure formed from hexamethylene diisocyanate (DURANATE TPA manufactured by Asahi Kasei Chemicals) and 17.50 parts by mass of N-methylpyrrolidone, and the mixture was kept at 70° C. for 1 hour in a nitrogen atmosphere. After that, 8.3 parts by mass of dimethylol propanoic acid was added dropwise. After the infrared spectrum of the reaction liquid was measured to confirm that the absorption of isocyanate group had disappeared, 5.59 parts by mass of N,N-dimethylethanolamine and 132.5 parts by mass of water were added to obtain a blocked polyisocyanate aqueous dispersion (B) having a solid content of 40% by mass. The blocked isocyanate crosslinking agent has four functional groups and an NCO equivalent weight of 280.

(Polymerization of Polyester Resin C)

In a stainless steel autoclave equipped with a stirrer, a thermometer, and a partial reflux condenser, 194.2 parts by mass of dimethyl terephthalate, 184.5 parts by mass of dimethyl isophthalate, 14.8 parts by mass of dimethyl 5-sulfoisophthalate sodium salt, 233.5 parts by mass of diethylene glycol, 136.6 parts by mass of ethylene glycol, and 0.2 parts by mass of tetra-n-butyl titanate were charged, and the transesterification reaction was conducted at a temperature of 160° C. to 220° C. over 4 hours. Next, the temperature was raised to 255° C., the pressure of the reaction system was gradually reduced, and then the reaction was conducted under a reduced pressure of 30 Pa for 1 hour and 30 minutes to obtain a copolyester resin (C). The obtained copolyester resin (C) was pale yellow and transparent. The reduced viscosity of the copolyester resin (C) was measured and confirmed to be 0.70 dl/g. The glass transition temperature by DSC was 40° C.

(Preparation of Polyester Aqueous Dispersion Cw)

In a reactor equipped with a stirrer, a thermometer and a reflux device, 15 parts by mass of polyester resin (C) and 15 parts by mass of ethylene glycol n-butyl ether were charged, and heated and stirred at 110° C. to dissolve the resin. After the resin was completely dissolved, 70 parts by mass of water was gradually added to the polyester solution while stirring was performed. After the addition, the liquid was cooled to room temperature while stirring was performed to prepare a milky white polyester aqueous dispersion (Cw) having a solid content of 15% by mass.

(Preparation of Coating Liquid D)

The following agents were mixed in a mixed solvent of water and isopropanol to prepare a coating liquid (D) having a solid mass ratio of urethane resin solution (A)/crosslinking agent (B)/polyester aqueous dispersion (Cw) of 25/26/49.

| | |
|---|---|
| Urethane resin solution (A) | 3.55 parts by mass |
| Crosslinking agent (B) | 3.16 parts by mass |
| Polyester aqueous dispersion (Cw) | 16.05 parts by mass |
| Particles (Silica by drying process having average particle size of 200 nm, solid concentration of 3.5% by mass) | 0.47 parts by mass |
| Particles (Silica sol having average particle size of 40 to 50 nm, solid concentration of 30% by mass) | 1.85 parts by mass |
| Surfactant (Silicone-based, solid concentration of 10% by mass) | 0.30 parts by mass |

(Preparation of Copolyester Resin Aqueous Dispersion (E))

In a reaction vessel, 95 parts by mass of dimethyl terephthalate, 95 parts by mass of dimethyl isophthalate, 35 parts by mass of ethylene glycol, 145 parts by mass of neopentyl glycol, 0.1 part by mass of zinc acetate, and 0.1 part by mass of antimony trioxide were charged, and the transesterification reaction was conducted at 180° C. over 3 hours. Next, 6.0 parts by mass of 5-sulfoisophthalic acid sodium salt was added, and an esterification reaction was conducted at 240° C. over 1 hour, and then polycondensation reaction was conducted at 250° C. under reduced pressure (10 to 0.2 mmHg) over 2 hours to obtain a copolyester-based resin having a number average molecular weight of 19,500 and a softening point of 60° C.

A viscous melt was obtained by stirring 300 parts by mass of the obtained copolyester-based resin and 140 parts by mass of butyl cellosolve at 160° C. for 3 hours, 560 parts by mass of water was gradually added to this melt, and after 1 hour, a uniform pale white copolyester resin aqueous dispersion (E) having a solid concentration of 30% was obtained.

(Preparation of Coating Liquid (F) for Easy Lubricating Resin Layer Formation)

Mixed were, 15 parts by mass of a 30% by mass aqueous dispersion (E) of copolyester-based resin, 0.4 parts by mass of a 50% by mass aqueous solution of sodium dodecyl diphenyl oxide disulfonate, 0.5 parts by mass of a 40% by mass aqueous dispersion of polyethylene-based wax emulsion (molecular weight: 4,000), 51 parts by mass of water, and 30 parts by mass of isopropyl alcohol. Furthermore, a 10% by mass aqueous solution (0.3 parts by mass) of a fluorosurfactant (polyoxyethylene-2-perfluorohexylethyl ether), a 20% by mass aqueous dispersion (2.3 parts by mass) of colloidal silica (average particle size: 40 nm), and a 10% by mass aqueous dispersion (0.5 parts by mass) of benzoguanamine-based organic particles (average particle size: 2 μm) were added. Subsequently, the mixture was subjected to precision filtration through a felt-type polypropylene filter having a size of particles filtered (initial filtration efficiency of 95%) of 10 μm to prepare a coating liquid (F).

Example 1

The polyester resin (III) pellets were dried at 150° C. for 8 hours under reduced pressure (3 Torr), then supplied into an extruder, and melted at 285° C. This polymer was filtered through a filter medium of stainless steel sintered body (nominal filtration accuracy: cutting 95% of 10 μm particles), and extruded into a sheet shape from the mouthpiece, and the sheet was brought into contact with a casting drum having a surface temperature of 30° C. and cooled and solidified by an electrostatic casting method, thereby fabricating an unstretched film. This unstretched film was uniformly heated to 75° C. using a heating roll, heated to 100° C. using a non-contact heater, and subjected to 3.3-fold roll stretching (longitudinal stretching). Next, the coating liquid (D) was applied to the casting drum contact surface of the uniaxially stretched film, and the coating liquid (F) was applied to the opposite surface by a reverse kiss coating method so that the thicknesses of resin solids after drying were both 0.3 μm. The uniaxially stretched film having coating layers was guided to a tenter while being dried, heated to 140° C., and transversely stretched 4.0 times, the width of the film was fixed, heat treatment was performed at 240° C. for 5 seconds, and the film was then relaxed at 210° C. by 4% in the transverse direction to obtain a polyester film having a thickness of 188 μm.

Using the same sample as in Example 1, the film acid value distribution in the machine direction was evaluated. The results are presented in Table 3.

Using the same sample as in Example 1, the surface free energy of the surface coated with the coating liquid (D) was evaluated. The results are presented in Table 3.

A conductive layer was provided on the surface of the polyester film obtained in Example 1 opposite to the surface coated with the coating liquid (D) (cured surface of coating liquid (D)).

Table 1A presents the content rate of the ester constituting unit derived from a specific dicarboxylic component with respect to all ester constituting units in the polyester, Table 1B presents the layer configuration of the polyester films as a substrate, and Table 2 presents various physical property values of the polyester films as a substrate.

In Example 1, the conductive layer exhibited favorable close adhesive properties to the substrate, and cracking of the conductive layer and the like did not occur when the polyester film was bent.

Example 2

A polyester film was obtained in the same manner as in Example 1 except that the film thickness after biaxial stretching was changed to 125 μm.

Examples 3 and 4

Polyester films having a thickness of 125 μm were obtained in the same manner as in Example 2 except that the configurations of the raw material polyester resins were changed to those presented in Table 1B.

Example 5

The configuration of the raw material polyester resin was changed to that presented in Table 1B. Specifically, for the formation of skin layer, the PET resin (I) pellets and the polyester resin (III) pellets were dried, then mixed at polyester resin (III)/PET resin (I)=85% by mass/15% by mass, and melted at 285° C. using a melt extruder separate from the core layer forming system. For the core layer forming system, polyester resin (III) pellets were dried and then melted at 285° C. using a melt extruder. These polymers were filtered through a filter medium of stainless steel sintered body (nominal filtration accuracy: cutting 95% of 10 μm particles), joined in the feed block, and extruded into a sheet shape from the mouthpiece, and the sheet was brought into contact with a casting drum having a surface temperature of 30° C. and cooled and solidified by an electrostatic casting method, thereby fabricating an unstretched film. The layer ratio of the unstretched film was adjusted to skin layer/core layer/skin layer=9/82/9 by calculating the discharge rate of each extruder. This unstretched film was uniformly heated to 75° C. using a heating roll, heated to 100° C. using a non-contact heater, and subjected to 3.3-fold roll stretching (longitudinal stretching). Next, the coating liquid (D) was applied to the casting drum contact surface of the uniaxially stretched film by a reverse kiss coating method so that the thickness of resin solid after drying was 0.3 μm. The uniaxially stretched film having a coating layer was guided to a tenter while being dried, heated to 140° C., and transversely stretched 4.0 times, the width of the film was fixed, heat treatment was performed at 240° C. for 5 seconds, and the film was then relaxed at 210° C. by 4% in the transverse direction to obtain a laminated polyester film having a thickness of 50 μm.

Example 6

A laminated polyester film having a thickness of 50 μm was obtained in the same manner as in Example 5 except that the configuration of the raw material polyester resin was changed to that presented in Table 1B.

Example 7

A laminated polyester film having a thickness of 75 μm was obtained in the same manner as in Example 5 except that the configuration of the raw material polyester resin and coating layer formation was changed to that presented in Table 1B. The evaluation of various physical properties is presented in Table 4.

Example 8

A laminated polyester film having a thickness of 60 μm was obtained in the same manner as in Example 5 except that the configuration of the raw material polyester resin and coating layer was changed to that presented in Table 1B. The evaluation of various physical properties is presented in Table 4.

Example 9

A laminated polyester film having a thickness of 38 μm was obtained in the same manner as in Example 5 except that the configuration of the raw material polyester resin and coating layer was changed to that presented in Table 1B. The evaluation of various physical properties is presented in Table 4.

Example 10

A laminated polyester film having a thickness of 25 μm was obtained in the same manner as in Example 5 except that the configuration of the raw material polyester resin and coating layer was changed to that presented in Table 1B. The evaluation of various physical properties is presented in Table 4.

Comparative Example 1

A polyester film having a thickness of 188 μm was obtained in the same manner as in Example 1 except that the configuration of the raw material polyester resin was changed to that presented in Table 1B.

Comparative Example 2, 3

A polyester film having a thickness of 125 μm was obtained in the same manner as in Example 2 except that the configuration of the raw material polyester resin was changed to that presented in Table 1B.

Comparative Example 4

A laminated polyester film having a thickness of 50 μm was obtained in the same manner as in Example 5 except that the configuration of the raw material polyester resin was changed to that presented in Table 1B.

Comparative Example 5

A polyester film having a thickness of 38 μm was obtained in the same manner as in Example 5 except that the film thickness per 1000 m in the transverse direction of the film to the thickness presented in Table 4. The evaluation of various physical properties is presented in Table 4.

Comparative Example 6

A polyester film having a thickness of 75 μm was obtained in the same manner as in Example 5 except that the film thickness per 1000 m in the transverse direction of the film to the thickness presented in Table 4. The evaluation of various physical properties is presented in Table 4.

Comparative Example 7

A laminated polyester film having a thickness of 60 μm was obtained in the same manner as in Example 5 except that the film thickness per 1000 m in the transverse direction of the film to the thickness presented in Table 4. The evaluation of various physical properties is presented in Table 4.

TABLE 1A

| | Content rate of ester constituting unit derived from specific dicarboxylic component to all ester constituting units of polyester [mol % ] | |
|---|---|---|
| | TPA-derived constitutional unit | IPA-derived constitutional unit |
| Example 1 | 98.6 | 1.4 |
| Example 2 | 98.6 | 1.4 |
| Example 3 | 98.7 | 1.3 |
| Example 4 | 98.9 | 1.1 |
| Example 5 | 98.6 | 1.4 |
| Example 6 | 98.8 | 1.2 |
| Example 7 | 98.7 | 1.3 |
| Example 8 | 98.8 | 1.2 |
| Example 9 | 98.9 | 1.1 |
| Example 10 | 98.8 | 1.2 |
| Comparative Example 1 | 99.6 | 0.4 |
| Comparative Example 2 | 99.6 | 0.4 |
| Comparative Example 3 | 100.0 | 0.0 |
| Comparative Example 4 | 99.8 | 0.2 |

TPA: Terephthalic acid
IPA: Isophthalic acid

TABLE 1B

| | Layer configuration of film | | | | | | Formation of coating layer | | Thickness of |
|---|---|---|---|---|---|---|---|---|---|
| | Skin layer 1 | | Core layer | | Skin layer 2 | | | | |
| | PET resin (I) (% by mass) | Polyester resin (III) (% by mass) | PET resin (II) (% by mass) | Polyester resin (III) (% by mass) | PET resin (I) (% by mass) | Polyester resin (III) (% by mass) | Casting drum contact surface side | Casting drum noncontact surface side | biaxially stretched film (μm) |
| Example 1 | | | | 100 | | | Coating liquid (D) | Coating liquid (F) | 188 |
| Example 2 | | | | 100 | | | Coating liquid (D) | Coating liquid (F) | 125 |

TABLE 1B-continued

| | Layer configuration of film | | | | | | | | |
|---|---|---|---|---|---|---|---|---|---|
| | Skin layer 1 | | Core layer | | Skin layer 2 | | Formation of coating layer | | Thickness of |
| | PET resin (I) (% by mass) | Polyester resin (III) (% by mass) | PET resin (II) (% by mass) | Polyester resin (III) (% by mass) | PET resin (I) (% by mass) | Polyester resin (III) (% by mass) | Casting drum contact surface side | Casting drum noncontact surface side | biaxially stretched film (μm) |
| Example 3 | | | 10 | 90 | | | Coating liquid (D) | Coating liquid (F) | 125 |
| Example 4 | | | 20 | 80 | | | Coating liquid (D) | Coating liquid (F) | 125 |
| Example 5 | 1.35 | 7.65 | | 82 | 1.35 | 7.65 | Coating liquid (D) | — | 50 |
| Example 6 | 1.35 | 7.65 | 10 | 72 | 1.35 | 7.65 | Coating liquid (D) | — | 50 |
| Example 7 | 1.7 | 6.8 | | 83 | 1.7 | 6.8 | — | — | 75 |
| Example 8 | 1.7 | 6.8 | | 83 | 1.7 | 6.8 | — | — | 60 |
| Example 9 | 5.9 | 4.1 | 4.2 | 75.8 | 5.9 | 4.1 | — | — | 38 |
| Example 10 | 5.9 | 4.1 | 4.2 | 75.8 | 5.9 | 4.1 | — | — | 25 |
| Comparative Example 1 | | | 70 | 30 | | | Coating liquid (D) | Coating liquid (F) | 188 |
| Comparative Example 2 | | | 70 | 30 | | | Coating liquid (D) | Coating liquid (F) | 125 |
| Comparative Example 3 | | | 100 | | | | Coating liquid (D) | Coating liquid (F) | 125 |
| Comparative Example 4 | 1.35 | 7.65 | 82 | | 1.35 | 7.65 | Coating liquid (D) | — | 50 |

TABLE 2

| | Amount of change in haze (ΔHz) | Intrinsic viscosity of film | 150° C. storage modulus × $10^8$ [Pa] | | | Acid value (AV) | Close adhesive properties to conductive |
|---|---|---|---|---|---|---|---|
| | [%] | [dl/g] | MD | TD | Average | [eq/ton] | paste [%] |
| Example 1 | 0.03 | 0.62 | 8.41 | 6.59 | 7.50 | 54.7 | 100 |
| Example 2 | 0.00 | 0.62 | 8.31 | 6.51 | 7.41 | 54.5 | 100 |
| Example 3 | 0.91 | 0.62 | 8.35 | 6.55 | 7.45 | 50.1 | 100 |
| Example 4 | 1.81 | 0.61 | 8.41 | 6.59 | 7.50 | 47.9 | 100 |
| Example 5 | 0.03 | 0.62 | 7.22 | 5.56 | 6.39 | 53.3 | 100 |
| Example 6 | 0.91 | 0.62 | 7.46 | 5.74 | 6.60 | 49.2 | 100 |
| Example 7 | 0.28 | 0.62 | 8.52 | 5.98 | 7.25 | 51.0 | 100 |
| Example 8 | 0.18 | 0.61 | 8.75 | 6.31 | 7.53 | 49.0 | 100 |
| Example 9 | 1.63 | 0.60 | 8.54 | 6.26 | 7.40 | 48.0 | 100 |
| Example 10 | 0.82 | 0.60 | 8.30 | 6.52 | 7.41 | 48.0 | 100 |
| Comparative Example 1 | 6.35 | 0.59 | 8.97 | 7.03 | 8.00 | 39.1 | 77 |
| Comparative Example 2 | 6.35 | 0.59 | 8.86 | 6.94 | 7.90 | 38.8 | 75 |
| Comparative Example 3 | 9.10 | 0.58 | 8.55 | 7.71 | 8.13 | 34.3 | 50 |
| Comparative Example 4 | 7.44 | 0.59 | 8.70 | 6.70 | 7.70 | 36.2 | 68 |

MD: Machine direction
TD: Transverse direction

TABLE 3

| | Machine direction acid value (AV) measurement position [m] | Acid value (AV) [eq/ton] | Maximum acid value (AV) [eq/ton] | Minimum acid value (AV) [eq/ton] | Maximum − minimum acid value (AV) [eq/ton] | Surface free energy of coating layer (D) (γS) [mN/m] |
|---|---|---|---|---|---|---|
| Example 1 | 2000 | 54.9 | 55.7 | 53.8 | 1.9 | 49.5 |
| | 4000 | 54.7 | | | | |
| | 6000 | 53.8 | | | | |
| | 8000 | 55.7 | | | | |
| | 10000 | 54.1 | | | | |

TABLE 4

| | Storage modulus (X) at 170° C. in transverse direction of film [Mpa] | Film thickness per 1000 mm in transverse direction (TD direction) of film: Maximum value (Ymax) [mm] | Minimum value (Ymin) [mm] | X × ($Ymax^3$ − $Ymin^3$) | 0.0591 × (X × $Ymin^3$) + 0.005 | Film flatness after heating | Close adhesive properties to conductive paste [%] |
|---|---|---|---|---|---|---|---|
| Example 7 | 423 | 0.0757 | 0.0743 | 0.010 | 0.015 | ○ | 100 |
| Example 8 | 483 | 0.0609 | 0.0591 | 0.009 | 0.011 | ○ | 100 |
| Example 9 | 431 | 0.0392 | 0.0379 | 0.002 | 0.006 | ○ | 100 |
| Example 10 | 391 | 0.0255 | 0.0245 | 0.001 | 0.005 | ○ | 100 |
| Comparative Example 5 | 391 | 0.0409 | 0.0366 | 0.008 | 0.006 | Δ | 95 |
| Comparative Example 6 | 391 | 0.0790 | 0.0709 | 0.053 | 0.013 | Δ | 68 |
| Comparative Example 7 | 433 | 0.0632 | 0.0567 | 0.030 | 0.010 | Δ | 77 |

According to Examples, it was possible to obtain biaxially oriented polyester films, which were excellent in thermoformability as well as had less oligomer precipitation (whitening) even under heating during forming, the coating process of a conductive paste, and the coating process of a pressure-sensitive adhesive resin and the like. Furthermore, it was possible to suppress a decrease in appearance quality, and a decrease in productivity due to process contamination. The biaxially oriented polyester films are also excellent in elasticity and excellent in workability and durability. Furthermore, it is possible to provide a biaxially oriented polyester film, which is suitably used in formed products, substrate films for membrane switches, separator films, and the like that are required to maintain the shape.

Particularly in Examples 7 to 10, the above-mentioned relational expression was satisfied and thus flatness of the polyester films after heat processing was excellent (see Table 4 and OK in FIG. 1). For this reason, polyester films excellent in flatness such as those in Examples 7 to 10 are suitably used in substrate films for membrane switches and separator films.

Furthermore, in Examples 7 to 10 and Comparative Example 5, $X \times (Ymax^3 - Ymin^3)$ is 0 or more and 0.020 or less. In Examples 7 to 10 and Comparative Example 5, (Ymax−Ymin) is 0 or more and 0.005 or less. For this reason, in Examples 7 to 10 and Comparative Example 5, close adhesive properties to the conductive layer were excellent (see Table 4). In terms of the relation with $X \times (Ymax^3 - Ymin^3)$, Comparative Example 5 is Example. In terms of the relation with (Ymax−Ymin), Comparative Example 5 is Example.

On the other hand, in all of Comparative Examples 1 to 4, since the content rate of an ester constituting unit derived from an isophthalic acid component with respect to 100 mol % of all ester constituting units in all polyester resins was outside the range of the present invention and the acid value of the substrates was also outside the range of the present invention, various physical properties such as close adhesive properties to the conductive paste and formability were insufficient. In Comparative Examples 5 to 7, the left side of the above-mentioned relational expression exceeds the right side. For this reason, in Comparative Examples 5 to 7, the flatness of the polyester films after heat processing was poor (see Table 4 and NG in FIG. 1). Therefore, polyester films inferior in flatness such as those in Comparative Examples 5 to 7 are not suitable as substrate films for membrane switches and separator films.

Furthermore, in Comparative Examples 6 and 7, $X \times (Ymax^3 - Ymin^3)$ is greater than 0.020. In Comparative Examples 6 and 7, (Ymax−Ymin) is greater than 0.005. For this reason, in Comparative Examples 6 and 7, close adhesive properties to the conductive layer were also inferior (see Table 4).

INDUSTRIAL APPLICABILITY

According to the polyester film of the present invention, it is possible to suppress a decrease in appearance quality and a decrease in productivity due to process contamination since the polyester film is excellent in thermoformability as well as has less oligomer precipitation (whitening) even under heating during forming and in the coating process of a conductive paste and the coating process of a pressure-sensitive adhesive resin and the like. In addition, since the polyester film is also excellent in elasticity, it is possible to provide a polyester film that is suitably used in formed products, substrate films for membrane switches, and the like that are required to maintain the shape stably.

The invention claimed is:

1. A membrane switch sheet comprising two substrate films for membrane switches and a spacer sheet provided between the two substrate films for membrane switches, wherein the substrate films for membrane switches each independently comprise a laminated biaxially oriented polyester film that satisfies the following (1) to (10) and a conductive layer on at least one surface of the laminated biaxially oriented polyester film:

(1) a content rate of an ester constituting unit derived from an isophthalic acid component is 0.5 mol % or more and 5.0 mol % or less with respect to 100 mol % of all ester constituting units in all polyester resins constituting the laminated biaxially oriented polyester film;

(2) an amount of change in haze of the laminated biaxially oriented polyester film, Δhaze {Δhaze=(haze after heating)−(haze before heating)} is 5.0% or less when the film is heated at 150° C. for 30 minutes;

(3) an intrinsic viscosity of the laminated biaxially oriented polyester film is 0.59 dl/g or more and 0.65 dl/g or less;

(4) a storage modulus of the laminated biaxially oriented polyester film at 150° C. is $5.0 \times 10^8$ [Pa] or more and $7.6 \times 10^8$ [Pa] or less as an average value of storage moduli in a machine direction and a transverse direction of the film when a polyester film having a width of 5 mm is subjected to measurement at a grip interval of 30 mm using a dynamic viscoelasticity measuring instrument under conditions of a tensile mode, a frequency of 10 Hz, and a rate of temperature increase of 5° C./min;

(5) an acid value of the laminated biaxially oriented polyester film is 40 eq/ton or more and 60 eq/ton or less;

(6) polyethylene terephthalate is a main constituent of the polyester resin constituting the laminated biaxially oriented polyester film;

(7) the thickness of the laminated biaxially oriented polyester film is 25 μm or more and 75 μm or less;

(8) (Ymax−Ymin) is 0 or more and 0.005 or less;

(9) the following relational expression is satisfied:

$$X \times (Y\max^3 - Y\min^3) \leq 0.0591 \times (X \times Y\min^3) + 0.005$$

wherein X is a storage modulus at 170° C., and Y is a film thickness per 1000 mm in a transverse direction with Ymax as a maximum value and Ymin as a minimum value; and

(10) the laminated biaxially oriented polyester film comprises a first skin layer, a core layer, and a second skin layer in that order.

2. The membrane switch sheet according to claim 1, wherein a polyester resin recycled from PET bottles is contained at 50% by mass or more and 100% by mass or less with respect to 100% by mass of all polyester resins contained in the laminated biaxially oriented polyester film.

3. The membrane switch sheet according to claim 1, wherein a change in acid value of the laminated biaxially oriented polyester film as a substrate per 10,000 m in a machine direction is 2 eq/ton or less.

4. The membrane switch sheet according to claim 1, comprising a resin layer containing at least one resin selected from a polyester-based resin, a polyurethane-based resin, or an acrylic resin on at least one side of the laminated biaxially oriented polyester film.

5. The membrane switch sheet according to claim 1, wherein $X \times (Y\max^3 - Y\min^3)$ in the laminated biaxially oriented polyester film is 0.020 or less.

* * * * *